UNITED STATES PATENT OFFICE.

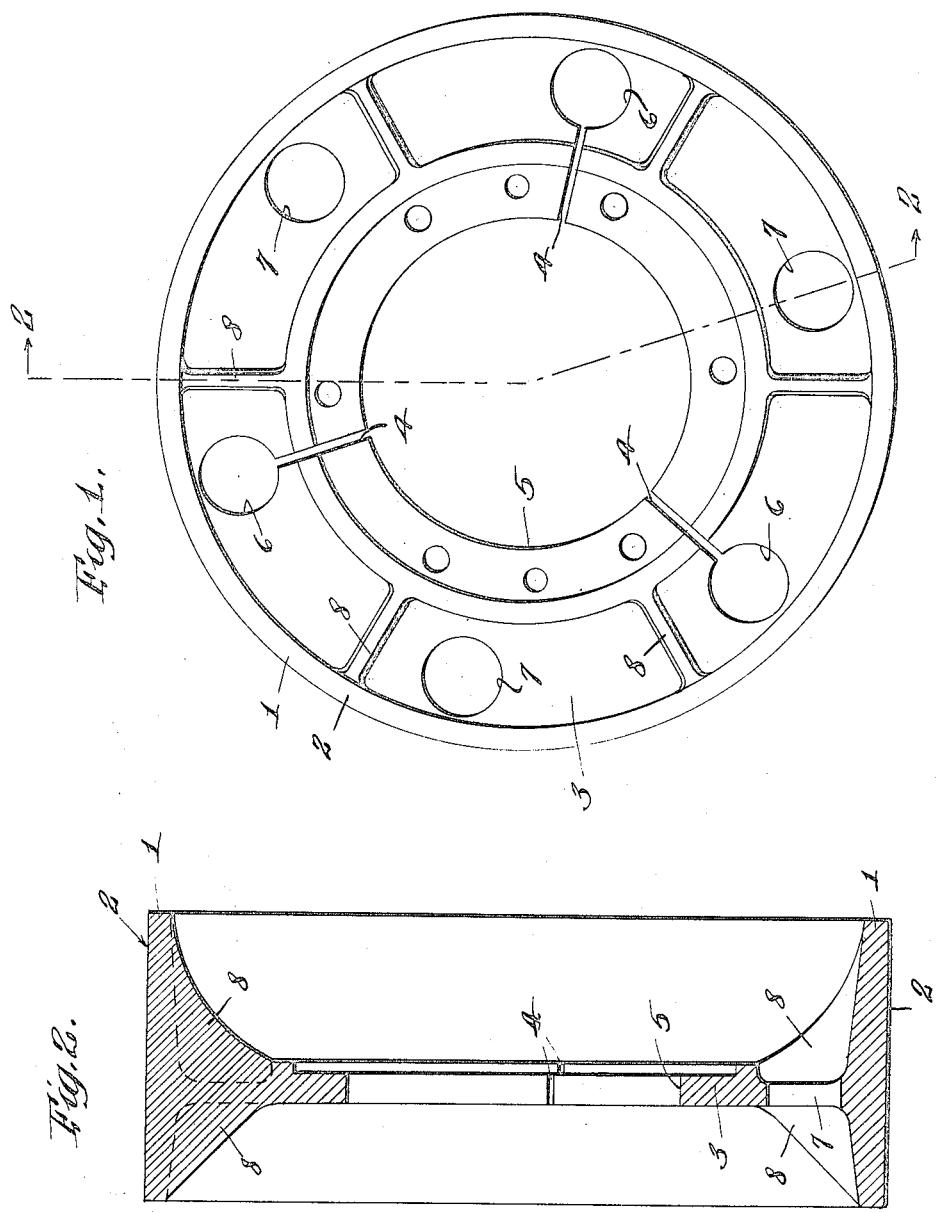

LOUIS M. STELLMANN, OF SYRACUSE, NEW YORK, ASSIGNOR TO H. H. FRANKLIN MANUFACTURING COMPANY, OF SYRACUSE, NEW YORK, A CORPORATION OF NEW YORK.

BRAKE DRUM.

1,426,684.  Specification of Letters Patent.  Patented Aug. 22, 1922.

Application filed May 25, 1921. Serial No. 472,401.

*To all whom it may concern:*

Be it known that I, LOUIS M. STELLMANN, a citizen of the United States, and a resident of Syracuse, in the county of Onondaga and State of New York, have invented a certain new and useful Brake Drum, of which the following is a specification.

This invention relates to brake drums such as are used in motor vehicles on the rear axle adjacent the drive wheels, and has for its object a brake drum, so constructed that it will expand under the influence of the heat generated by the brake band when applied to the drum; without cracking.

The invention consists in the novel features and in the combinations and constructions hereinafter set forth and claimed.

In describing this invention, reference is had to the accompanying drawings in which like characters designate corresponding parts in all the views.

Figure 1 is an elevation of this brake drum.

Figure 2 is a sectional view on line 2—2, Fig. 1.

This brake drum comprises a cylindrical flange the periphery of which constitutes the brake surface, and a discoidal body or web, the drum being formed with slots at regular intervals extending in radial directions to make the drum expansible under the heat generated by the brake band.

1 designates the cylindrical flange, the periphery 2 of which constitutes the brake surface on which the usual brake band acts.

3 is the discoidal web which is preferably located between the side edges of the flanges instead of at one end of or edge of the flange.

In the illustrated embodiment of my brake drum, the slots designated 4 extend outwardly and preferably radially from the central opening 5 of the discoidal web 3 and terminate short of the inner face of the flange 1, and preferably open into transverse perforations 6 formed in the discoidal web 3 near the flange 1. As here shown, additional perforations 7 are provided midway between the perforations 6, and the slots 4 open into alternate perforations. Preferably the drum is formed with transverse webs 8 located on opposite sides of the discoidal web 3 in the angles between the inner face of the cylindrical flange 1, and the opposite sides of the discoidal web 3, these transverse flanges being located between the perforations 6, 7. However, the perforations 6 into which the slots 4 open are preferably located nearer the transverse webs 8 than the perforations 7.

Ordinarily the heat generated by the friction of the brake band causes portions of the drum to expand faster than others, and causes the drum to crack.

Owing to the perforations and the slots and the arrangement thereof, the brake drum expands under the influence of heat and contracts without any ill effects due to uneven distortion and strain and without cracking and hence such drums retain their shape and practically never wear out or break.

What I claim is:

1. A brake drum for motor vehicles having slots extending part way therethrough in a radial direction to make the band expansible without cracking under the influence of the heat generated by the friction of the brake band, substantially as and for the purpose described.

2. A brake drum for motor vehicles having a cylindrical flange, the periphery of which constitutes the brake surface of the drum, and a discoidal web within the flange and formed with a central opening, the web being formed with slots extending outwardly from the central opening, substantially as and for the purpose specified.

3. A brake drum for motor vehicles having a cylindrical flange, the periphery of which constitutes the brake surface of the drum, and a discoidal web within the flange and formed with a central opening, the web being formed with radial slots at intervals from such central opening, substantially as and for the purpose set forth.

4. A brake drum for motor vehicles having a cylindrical flange, the periphery of which constitutes the brake surface of the drum, and a discoidal web within the flange and formed with a central opening, the web being formed with perforations therethrough at intervals near the inner face of said flange, and slots extending from such perforations to the central opening of the web, substantially as and for the purpose described.

5. A brake drum for motor vehicles having a cylindrical flange, the periphery of which constitutes the brake surface of the drum, and a discoidal web within the flange and formed with a central opening, the web being formed with perforations therethrough at intervals near the inner face of said flange, and radial slots extending from such perforations to the central opening of the web, substantially as and for the purpose specified.

6. A brake drum for motor vehicles having a cylindrical flange, the periphery of which constitutes the brake surface of the drum, a discoidal web within the flange and transverse webs at intervals in the angle formed by the discoidal web and the inner face of the cylindrical flange, the discoidal web having a central opening and being provided with slots extending from the central opening toward the flange, the slots being located between the transverse webs, substantially as and for the purpose set forth.

7. A brake drum for motor vehicles having a cylindrical flange, the periphery of which constitutes the brake surface of the drum, a discoidal web within the flange and transverse webs at intervals in the angle formed by the discoidal web and the inner face of the cylindrical flange, the discoidal web having a central opening and with perforations between the webs and the discoidal web being also formed with slots extending from the central opening into the perforations, substantially as and for the purpose described.

8. A brake drum for motor vehicles having a cylindrical flange, the periphery of which constitutes the brake surface of the drum, a discoidal web within the flange and transverse webs at intervals in the angle formed by the discoidal web and the inner face of the cylindrical flange, the discoidal web having a central opening and with perforations between the webs, the discoidal web being also formed with slots extending from the central opening into alternate perforations, substantially as and for the purpose specified.

9. A brake drum for motor vehicles having a cylindrical flange, the periphery of which constitutes the brake surface of the drum, and a discoidal web within the flange and formed with a central opening, the web being formed with slots extending outwardly from the central opening, the drum being formed of cast iron and having a chilled peripheral surface for coacting with the brake band, substantially as and for the purpose described.

In testimony whereof, I have hereunto signed my name, at Syracuse, in the county of Onondaga, and State of New York, this 21st day of May, 1921.

LOUIS M. STELLMANN.